United States Patent [19]

Sparlin et al.

[11] 3,939,912
[45] Feb. 24, 1976

[54] METHOD FOR REDUCING THE PRODUCTION OF WATER FROM OIL WELLS

[75] Inventors: Derry D. Sparlin; Harry A. Wahl, both of Ponca City, Okla.

[73] Assignee: Continental Oil Company, Ponca City, Okla.

[22] Filed: Mar. 21, 1975

[21] Appl. No.: 560,845

[52] U.S. Cl............................. 166/295; 166/305 R
[51] Int. Cl.² ................. E21B 33/138; E21B 43/00
[58] Field of Search ................ 166/295, 305 R, 275

[56] References Cited
UNITED STATES PATENTS

| | | |
|---|---|---|
| 2,842,206 | 7/1958 | Bearden et al...................... 166/295 |
| 3,022,825 | 2/1962 | Winsauer et al...................... 166/295 |
| 3,692,116 | 9/1972 | Sparlin............................... 166/295 |
| 3,721,295 | 3/1973 | Bott..................................... 166/295 |
| 3,760,880 | 9/1973 | Dollarhide ...................... 166/295 X |
| 3,776,311 | 12/1973 | Carnes et al....................... 166/295 |
| 3,826,311 | 7/1974 | Szabo et al. ......................... 166/295 |

*Primary Examiner*—Stephen J. Novosad
*Attorney, Agent, or Firm*—F. Lindsey Scott

[57] ABSTRACT

A method for reducing the production of water from oil wells by injecting into the oil wells a viscous oil containing from about 0.01 to about 10 weight percent of a coupling agent in an amount sufficient to saturate the subterranean formations penetrated by the wellbore radially for distance up to about 100 feet.

8 Claims, No Drawings

METHOD FOR REDUCING THE PRODUCTION OF WATER FROM OIL WELLS

A major problem in producing oil from subterranean formations is the production of water with the oil. Extra energy is required to lift the water to the surface where it is necessary to separate and dispose of the water. Many problems are associated with the separation and disposal of the water such as corrosion, sand production, emulsions, and the like.

A further problem exists in water injection wells in water-flooding operations where "thief" zones consume a disproportionately large amount of the injected water. The thief zones result in early water breakthrough in the thief zone areas and deficient flooding in other zones resulting in a suboptimum production of oil. The thief zones also necessitate the handling of increased quantities of water, increased water treating costs, and the like.

Heretofore numerous techniques have been used for plugging water zones. Some materials which have been used for this purpose are cement, plastics, silicates, and the like. These materials are normally placed in the vicinity of the water zone to form an impermeable barrier. Such barriers also tend to shut off oil production in producing wells thus requiring that the placement of the material be accurate since placement of the material over an oil producing zone will effectively shut off the oil production as well as any water production.

Polyacrylamide polymers and the like have also been used to reduce water production. Such polymers tend to coat the formation with hydrophilic molecules which are believed to restrict water flow and enhance oil flow. Some success has been achieved by the use of such materials, but the effect has been, in general, rather temporary. A further problem results from the fact that the polyacrylamide polymer tends to be produced with the produced fluids and has led to increased corrosion rates in producing wells, plugging of water disposal wells, and the like. In light of the fact that the production of water with the oil from oil producing wells is an ever-present problem, a continuing effort has been directed to the development of an improved method for reducing the production of water from oil producing wells.

It is an object of the present invention to provide a method for reducing the production of water from subterranean formations penetrated by a wellbore.

It is a further objective of the present invention to provide a method whereby the water permeability of subterranean formations penetrated by a wellbore is reduced.

It is a further objective of the present invention to provide a method for reducing the production of water from subterranean formations penetrated by a wellbore which does not require precise placement of the injected material.

It is a further objective of the present invention to provide a method for reducing the production of water from subterranean formations penetrated by a wellbore which does not require identification of or isolation of the water producing zone.

It is also an objective of the present invention to provide a method for restricting the flow of water into thief zones in water injection wells.

It has now been found that the objectives of the present invention are accomplished by injecting a viscous oil containing from about 0.01 to about 10 weight percent of a coupling agent into subterranean formations penetrated by a wellbore in an amount sufficient to saturate the subterranean formations radially for a distance up to about 100 feet.

In a preferred embodiment of the present invention, an oil having a viscosity from about 50 to about 10,000 cp (centipoise) and containing from about 0.01 to about 10 weight percent of a coupling agent selected from the group consisting of phenolic and furan resins and combinations thereof is injected into a subterranean formation penetrated by a wellbore in an amount sufficient to saturate the subterranean formation radially for a distance up to about 100 feet. The viscosity of the oil is measured at the temperature and pressure of the subterranean formation injected. The viscosity values of the oil discussed hereinafter are at the temperature and pressure of the subterranean formation unless otherwise stated. A useful formula for relating the viscosity at atmospheric pressure to the viscosity at varying pressures is:

$$u_p = u_o e^{ap}$$

where $u_p$ = viscosity (cp) under pressure, p;
$u_o$ = viscosity (cp) at one atmosphere;
$a = 0.6 \times 10^{-4}$/psia for hydrocarbon oils; and
$p$ = pressure, psia.

Such formation conditions (bottom-hole conditions) may vary widely, and temperatures from about 70°F to about 500°F have been reported, although bottom-hole temperatures from about 120°F to about 200°F are more common. Bottom-hole pressures from about 100 psi to about 20,000 psi have been reported, although typically bottom-hole pressures from about 1,000 to about 5,000 psi are encountered.

The viscous oils used are selected from hydrocarbon oils which have the viscosity characteristics described above. Some such oils are crude oils, heavy refined oils, tars, asphalts, heavy residual oils, pale oils, bright stock extracts, and the like. Many such oils are known to those skilled in the art and most such oils are suitable so long as they satisfy the viscosity requirements set forth above. While viscosities from about 50 to about 10,000 cp are useful, it has been found that the most desirable results are achieved when oils having a viscosity from 50 to 500 cp at the temperature and pressure of the formation injected are used.

The coupling agent is desirably selected from the group consisting of phenolic and furan resins and combinations thereof. Of these the phenolic resins are preferred and of these the phenolformaldehyde resins are particularly preferred.

As is well known in the art such resins vary from liquids to solids dependent upon the degree of polymerization and the degree of cross-linking in the resin. Such resins which are highly polymerized and highly cross-linked are thermosetting solids which are slightly soluble or insoluble in most oils and are not suitable for use in the method of the present invention.

Suitable resins are those phenolic and furan resins which are thermoplastic and which are partially cross-linked and partially polymerized. Such resins are liquids at the temperature and pressure of the formation into which the oils containing the coupling agent are injected. Desirably such resins are liquid at temperatures below about 100°F and preferably below about 70°F. Such partially polymerized and partially cross-linked resins have been found to be effective in forming solutions with the oils and in retaining the oils in the formations into which they are injected.

While applicants do not wish to be bound by any particular theory, it is believed that the partially polymerized partially cross-linked resins contain reactive sites which result in an increased retention of the oil-coupling agent mixture in said formations.

While the coupling agent is useful in concentrations from about 0.01 to about 10 weight percent, it has been found that particularly desirable results are achieved when from about 0.05 to about 1.0 weight percent is used.

The viscous oil containing the coupling agent is injected into the wellbore in an amount sufficient to saturate the subterranean formation radially for a distance up to about 100 feet. It is desirable that an amount sufficient to saturate the subterranean formation radially for a distance up to at least five feet be used, and desirably an amount sufficient to saturate the subterranean formation radially for a distance of about 10 to about 25 feet is preferred.

The viscous oil and coupling agent may be injected by means well known to those skilled in the art and will enter the formations, thus saturating the formations with viscous oil which tends to be retained in position by the coupling agent. In those instances wherein a highly porous oil-bearing formation is present, a high proportion of the viscous oil containing the coupling agent will tend to preferentially enter the oil-bearing formation. In such instances, it is desirable to use packers and the like to prevent such disproportionate injection of the viscous oil.

In some instances, it may be desirable to use packers and like techniques known to those skilled in the art to selectively inject the viscous oil containing the coupling agent into a selected formation such as thief zones and the like to prevent the injection or production of water from a particular formation. Such variations and modifications are obvious to those skilled in the art and need not be discussed further.

A further preferred embodiment of the present invention comprises the injection of viscous oil containing the coupling agent into an injection well in waterflooding operations wherein certain formations are absorbing a disproportionate amount of the water and functioning as thief zones, thereby reducing the efficiency of the waterflooding operation. In general, more viscous oil and higher concentrations of coupling agents should be used in thief zones than on producing zones. The injection of the viscous oil containing the coupling agent into such formations or into the well as a whole is effective in reducing the permeability of such thief zones to water, thereby improving the effectiveness of the waterflooding operation and the like. In such embodiments, it is preferred that the coupling agent be present in an amount equal to from 2.0 to 5.0 weight percent of the viscous oil-coupling agent mixture.

Having thus described the invention, it is pointed out that the foregoing description of preferred embodiments is illustrative rather than limiting in nature, and many variations and modifications of the present invention are possible within the scope of the present invention. Many such variations and modifications may appear obvious or desirable to those skilled in the art in light of the foregoing description of preferred embodiments and the following examples.

EXAMPLE 1

Two ⅞-inch diameter tygon tubes were filled with about 30 ml of a fine mesh sand with a grain distribution predominately between 100 and 325 U.S. mesh sizes (Oklahoma No. 1 sand) and packed tightly in a Hassler sleeve test cell. The sand was saturated with tap water, and a pressure of 100 psi was applied to the outside of the sleeve. Water was then flowed through the sand packs and the permeability measured. One sand pack was flushed with 180 ml of a heavy refined oil having a viscosity of 125 cp at 72°F. A treating fluid was prepared by mixing 1.4 volume percent of a coupling agent with the oil described above. The coupling agent was a phenolic furan resin blend (33 percent phenol formaldehyde resin in 67 percent furfuryl alcohol. The resin was Resin No. 7421A, manufactured by Durez Plastics Division, Hooker Chemical Company.).

The second sand pack was then flushed with 180 ml of the treating fluid. Both samples were then flushed with water until clean water was coming through and the permeabilities then measured. Both samples were then flushed with diesel oil until the flow rate stabilized and clean diesel fuel was coming through. Both samples were then flushed again with water until clean water was coming through and the permeabilities measured again. The results are shown below in Table I.

TABLE I

|  | First Core | Second Core |
| --- | --- | --- |
| Initial permeability (darcies) | 3.34 | 5.5 |
| Permeability after treatment (darcies) | 0.55 | 0.13 |
| Permeability after diesel oil flush (darcies) | 2.29 | 0.88 |

The tests clearly show that the use of the coupling agent in the treating fluid has resulted in a greater reduction in permeability than did the use of the heavy refined oil alone. This resulted in a permeability reduction which is retained in the presence of oils to a much greater extent than is the lesser permeability reduction achieved by the use of the heavy refined oil alone.

EXAMPLE 2

Approximately 30 ml of a fine mesh sand with grain size distribution predominately between 100 and 325 U.S. mesh sizes was packed tightly in a Hassler sleeve test cell. The sand was first saturated with tap water and a pressure of 100 psi applied on the outside of the sleeve. Water was then flowed through the sand packs and the permeability ($K_w$) of the sand measured. FRACTOL oil,* diluted to 200 cp with diesel oil, was then flowed through the pack until equilibrium conditions were attained and then the permeability ($K_o$) was measured with diesel oil.

*FRACTOL oil is a high viscosity fracturing fluid marketed by Humble Oil and Refining Company, Houston, Texas. The FRACTOL used was FRACTOL 4 which has the following physical properties:

| viscosity | (cs at 140°F) | 375 | solubility in $CCl_4$ (%) | 99.5 |
| --- | --- | --- | --- | --- |
|  | (SSF at 210°F) | 30 | Kiel filtration test | pass |
| flash point (°F) |  | >150 | color | black |

| | |
|---|---|
| water content (%) | <0.2 |

-continued

The sand pack was then treated by injecting 180 ml of treating fluid into the sand. The treating fluid was a mixture of the coupling agent of Example 1 mixed with the FRACTOL oil described above in the proportions shown below. The treating fluid was immediately followed by tap water until equilibrium was reached. The permeability ($K_w$) was then measured with water. The treated sand was then flushed with diesel oil until equilibrium was reached, and the permeability ($K_o$) was then measured with diesel oil. The results are shown below in Table II. All permeabilities are in darcies.

| | | | |
|---|---|---|---|
| viscosity (cs at 140°F) | 375 | solubility in $CCl_4$ (%) | 99.5 |
| (SSF at 210°F) | 30 | Kiel filtration test | pass |
| flash point (°F) | >150 | color | black |
| water content (%) | <0.2 | | |

TABLE II

| Resin Content of Treating Fluid | INITIAL PERMEABIL-ITY | | FINAL PERMEABILITY | | | |
|---|---|---|---|---|---|---|
| | | | | % Initial | | % Initial |
| wt. % | $K_w$ | $K_o$ | $K_w$ | $K_w$ | $K_o$ | $K_o$ |
| 0 | 4.76 | 4.87 | 1.90 | 39.9 | 4.76 | 97.7 |
| 0.5 | 4.54 | 4.83 | 0.65 | 14.3 | 3.73 | 77.2 |
| | 5.38 | 5.38 | 1.40 | 26.0 | 4.95 | 92.0 |
| 1.0 | 5.38 | 5.38 | 0.95 | 17.7 | 2.91 | 52.2 |
| | 5.29 | 5.34 | 1.27 | 24.0 | 4.21 | 78.8 |
| 1.5 | 5.17 | 4.91 | 0.85 | 16.4 | 2.79 | 56.8 |
| | 5.79 | 5.62 | 1.17 | 20.2 | 3.14 | 55.9 |
| 2.0 | 5.76 | 5.50 | 1.28 | 22.3 | 3.54 | 64.4 |
| | 5.21 | 5.31 | 1.04 | 20.0 | 2.99 | 56.3 |
| 4.0 | 5.25 | 4.99 | 0.66 | 12.6 | 1.34 | 26.9 |
| | 5.42 | 5.35 | 0.68 | 12.6 | 1.38 | 25.8 |
| 8.0 | 5.10 | 5.11 | 0.64 | 12.6 | 1.30 | 25.4 |
| | 5.65 | 5.58 | 0.67 | 11.9 | 1.57 | 28.1 |

The percent retained permeability $K_w$ and $K_o$ decreases with increasing resin concentrations. It would thus be desirable in wells containing fractures, thief zones, and the like to use a higher concentration of resin; for instance, 4 percent. In oil-producing wells, lower concentrations, i.e., 0.5 percent resin, are more desirable since the water permeability is reduced substantially, but the oil permeability is reduced to a lesser degree.

EXAMPLE 3

Tests similar to those in Example 2 were conducted using 0.5 weight percent resin and FRACTOL oils diluted to 300 and 400 cp.

TABLE III

| Fractol Oil | INITIAL PERMEABIL-ITY | | FINAL PERMEABILITY | | | |
|---|---|---|---|---|---|---|
| | | | | % Initial | | % Initial |
| Viscosity (cp) | $K_w$ | $K_o$ | $K_w$ | $K_w$ | $K_o$ | $K_o$ |
| 200 | 4.54 | 4.83 | 0.65 | 14.3 | 3.73 | 77.2 |
| 200 | 5.38 | 5.38 | 1.40 | 26.0 | 4.95 | 92.0 |
| 300 | 4.33 | 4.40 | 1.10 | 25.4 | 2.87 | 65.2 |
| 400 | 5.89 | 6.21 | 1.45 | 24.6 | 4.48 | 72.1 |

Increasing the viscosity of the oil beyond 200 cp does not appear to significantly effect the results.

EXAMPLE 4

The viscosity of a fuel oil sample was determined. Other portions of the fuel oil were then blended with varying amounts of a resin and the viscosity then measured. The resin was a 33 percent solution of No. 7421A phenolic resin dissolved in furfuryl alcohol. The 7421A resin is a product of the Durez Division of Hooker Chemical Company, N. Tonowanda, New York. The viscosities on all samples were measured with a FANN-VG meter at 100 rpm.

| Special Fuel Oil (ml) | Resin (ml) | Reading | Viscosity (cp) |
|---|---|---|---|
| 300 | 0 | 250 | 750 |
| 300 | 1.5 | 233 | 699 |
| 300 | 9.0 | 188 | 564 |
| 300 | 30.0 | 155 | 465 |

The addition of the resin blend decreases the viscosity of the oil-coupling agent mixture thus facilitating injection of the mixture into the formation.

Having thus described the invention, I claim:

1. A method for reducing the production of water from subterranean formations penetrated by a wellbore, said method consisting essentially of:
    a. mixing an oil having a viscosity from about 50 to about 10,000 cp at the pressure and temperature of said subterranean formations with a coupling agent selected from the group consisting of phenolic and furan resins and combinations thereof to produce a mixture containing from about 0.01 to about 10 weight percent coupling agent, said resins being liquid at the pressure and temperature of said subterranean formations; and, b. injecting said mixture into said formation in an amount sufficient to saturate said subterranean formations radially from said wellbore for a distance up to about 100 feet.

2. The method of claim 1 wherein said oil has a viscosity from about 50 to about 500 cp at the pressure and temperature of said subterranean formations.

3. The method of claim 2 wherein an amount of oil sufficient to saturate said subterranean formations radially for a distance equal to at least 5 feet is used.

4. The method of claim 2 wherein said coupling agent is present in an amount equal to from about 0.05 to about 1.0 weight percent.

5. The method of claim 4 wherein an amount of oil sufficient to saturate said subterranean formations radially for a distance from about 10 to about 25 feet is used.

6. The method of claim 5 wherein said coupling agent is a phenolic resin.

7. A method for reducing the water permeability of subterranean formations penetrated by a wellbore, said method consisting of:

a. mixing an oil having a viscosity from about 50 to about 10,000 cp at the pressure and temperature of said subterranean formations with a coupling agent selected from the group consisting of phenolic and furan resins and combinations thereof to produce a mixture containing from about 0.01 to about 10 weight percent coupling agent, said resins being liquid at the pressure and temperature of said subterranean formations; and, b. injecting said mixture into said formation in an amount sufficient to saturate said subterranean formations radially from said wellbore for a distance up to about 100 feet.

8. The method of claim 7 wherein said coupling agent is present in an amount equal to from about 2.0 to about 5.0 weight percent.

* * * * *